No. 872,057. PATENTED NOV. 26, 1907.
C. H. DOTY.
DUMP CAR.
APPLICATION FILED MAR. 11, 1907.
2 SHEETS—SHEET 1.
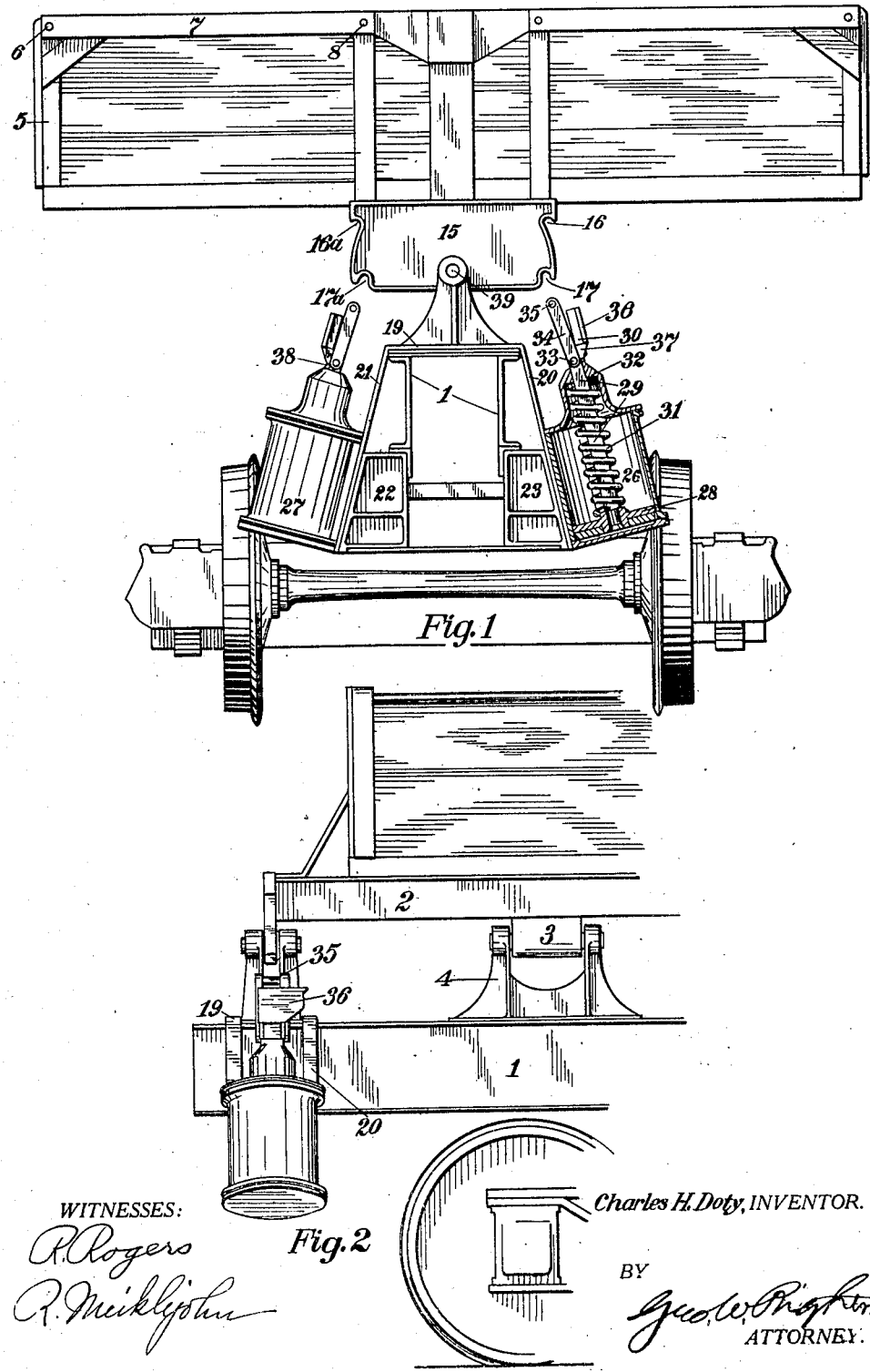

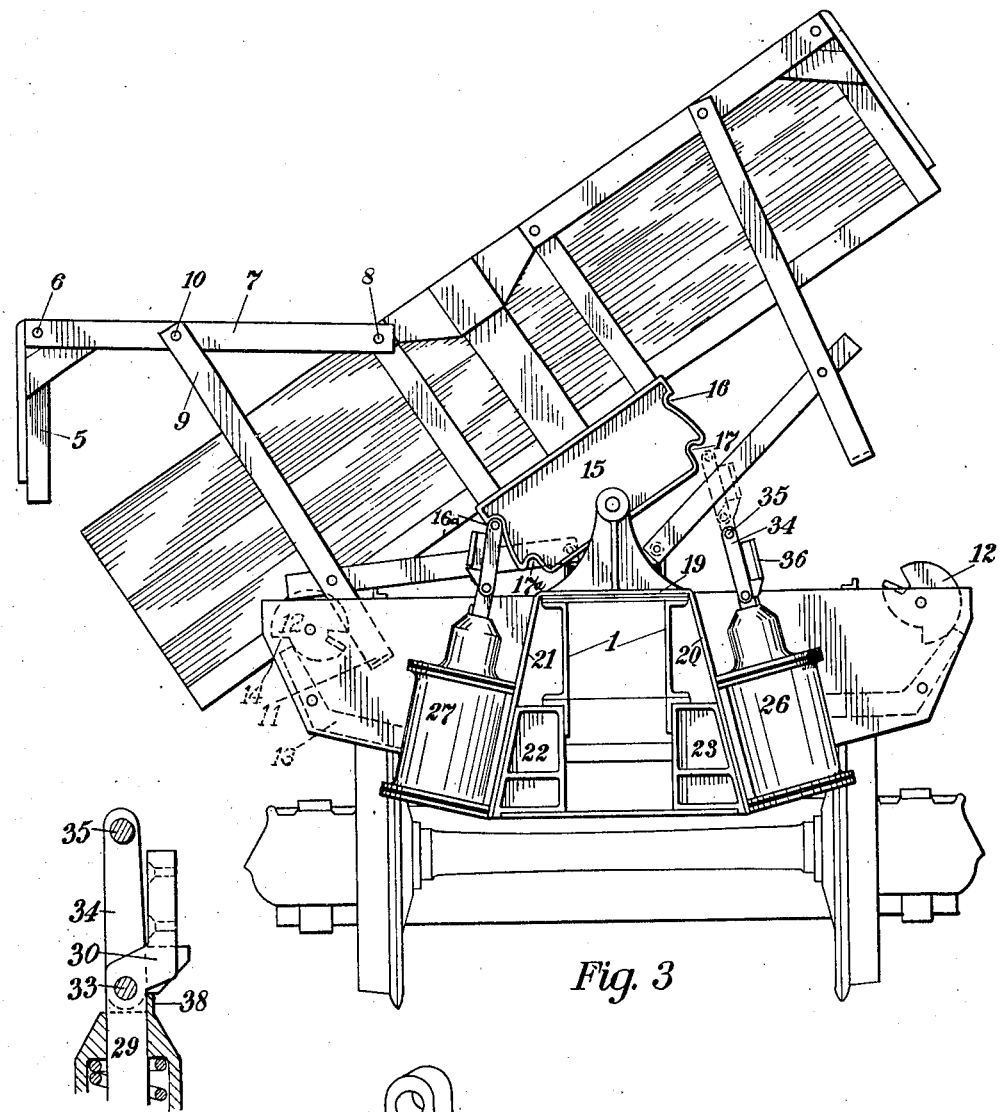
Fig. 3
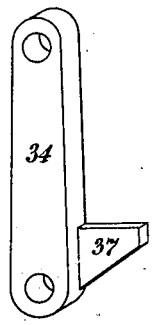
Fig. 4
Fig. 5
Charles H. Doty, INVENTOR.

UNITED STATES PATENT OFFICE.

CHARLES H. DOTY, OF COLUMBUS, OHIO, ASSIGNOR TO THE KILBOURNE AND JACOBS MANUFACTURING COMPANY, OF COLUMBUS, OHIO, A CORPORATION OF OHIO.

DUMP-CAR.

No. 872,057.

Specification of Letters Patent.

Patented Nov. 26, 1907.

Application filed March 11, 1907. Serial No. 361,784.

*To all whom it may concern:*

Be it known that CHARLES H. DOTY, a citizen of the United States, residing at Columbus, in the county of Franklin and State of Ohio, has invented certain new and useful Improvements in Dump-Cars, of which the following is a specification.

My invention relates to improvements in dump cars, and has especial reference to the provision of air operated means for dumping and righting said cars.

It contemplates the arrangement of a plurality of air cylinders at convenient points on the underframe construction of a car with reference to the points upon the car bed at which the dumping and righting force is to be applied; it further contemplates a link or pitman mounted upon the piston to engage a plate mounted upon the car body to dump same, whereupon said piston will be retracted to its normal position; it further contemplates the provision of a similar link or pitman mounted upon the piston of a second cylinder which is adapted to engage the opposite side of said plate at a higher point thereon to return the car body to its normal position or to right the same; it further contemplates the provision of means for dumping and righting the car, which remain in contact with the car body only while the air is acting upon the piston, and immediately upon the cutting off of the air supply, the piston will drop back into the cylinder out of contact with the car body, or preferably will be retracted by means of a coiled spring.

In the accompanying drawings, which are hereby made a part of this specification, Figure 1 is an end view of a dump car having cylinders mounted upon the underframe construction to dump and to right the car, the means of holding the car in normal position and of lifting the side door thereof when dumped being omitted; Fig. 2 is a side view of one of the cylinders and the end construction of the car; Fig. 3 is an end view of a car provided with my improvements in a dumped position, means for locking the car in normal position and unlocking the same being shown; Fig. 4 is a vertical section through the piston rod between the links; Fig. 5 is a detail of a link.

Referring to the drawings in which the same numerals indicate the same parts throughout, 1 is the center sill of the car and
2 is the car body pivotally mounted at 3 upon the supports 4, and adapted to rotate upon said pivotal points to either side, whereby the car may be dumped in either direction. The end frame construction of the car is shown in Figs. 1 and 3, in which 5 is the side door, hinged at 6 to the horizontal bar 7 which is pivoted at 8; the arm 9 is pivoted to arm 7 at 10 at its upper end and its lower end is formed of parallel bars connected at their lower ends 11, and engaging with the rotary lock 12, the lock being held in normal position by means of the pivoted lever 13 engaging with the shoulder 14 on the rotary lock. When the lever arm is lifted out of contact with the lock, the car may be dumped by the application of force thereto on the unlocked side. The construction of the lock and the means for operating and controlling the same, form no part of this invention, and need not be described further.

It should be stated however, that if the lock on one side of the car is released, no manipulation of the lock on the other side is necessary inasmuch as the depending arm rotates the same readily as said arm passes downwardly, and when the car is restored to its normal position the arm on the lowered side will pass upwardly over the lock until the lower end of said arm contacts with said lock, at which instant the arm on the raised side will have been returned to its position of contact with the lock on its side of the car.

The end of the car body is provided with the plate 15 which is provided at each side with the notches 16 and 17, the latter being arranged as here shown upon radii of different lengths.

Appropriately mounted upon the axles of the car is the center sill 1, which extends longitudinally and is the central supporting structure of the car body; adjacent the rear end of the said center sill I secure the strap 19 having the downwardly bent arms 20 and 21, the lower ends of which diverge from the center sill construction, and are supported by means of fillers 22 and 23 in their outstanding position.

On one side of the center sill upon each of the arms 20 and 21 is mounted a cylinder 26 and 27, the former shown in vertical section, the latter in full line. Within the cylinder is arranged the piston 28 carrying the piston rod 29, which passes through an opening in the upper end of the cylinder and is bent laterally as shown at 30 and having functions which need not be described in this application; the piston rod 29 carries a spring 31 which is in contact with the piston 28 at one end and with a shoulder 32 formed on the inner side of the upper end of the cylinder, at its other end, the function of the spring being to return the piston to its lower position after the same has been operated. Pivotally mounted upon the piston rod 29 at 33 is a link or pitman 34, the preferable construction however consisting of a pair of said links arranged in parallel, and pivoted at their lower ends on the pin 33 and connected at their upper ends by the pin 35. (See Fig. 2.) Secured to the laterally bent portion 30 of the piston rod is the plate 36 which need not be further described in this application; located beneath the plate and mounted upon the links 34 is a projection 37, which, when the links 34 tend to drop inwardly towards the center sill, will act as a stop therefor, and prevent the links from leaving the proper position for contact with the notches 16 and 17 mentioned above.

If the air be applied to the cylinder 26, the piston will be raised, thereby bringing the pin 35 on the links 34 in contact with the notch 17 on the plate 15; the pressure thereby exerted upon the car body will cause the same to be dumped toward the opposite side, as shown in Fig. 3. It is not necessary that the cross pin 35 on the links 34 remain in contact with the car body until the latter has reached its extreme dumping position, and therefore I show a short piston rod and consequently a cylinder of short length. The air is applied quickly to the piston, and the contact of the cross pin on the links with the plate on the car is sudden and gives the car body great impetus, so that the latter will continue the dumping movement after the contact therewith of the link construction has ceased.

The car body must be made strong enough so that the dumping movement may be rather violent, for the reason that many kinds of material, especially if the same are soft or moist, will not leave the car when it has assumed the slanting position; for this reason I contemplate a sharp, sudden contact of the link construction with the plate 15, so that the material in the car may be given a tendency outwardly away from the car bottom, to assure the complete dumping of the contents.

When the air is shut off, the spring will retract the piston into the cylinder to its normal position and the link construction 34 will be returned to proximity to the upper end of the cylinder; upon its return the lower end of the links 34 will engage a lug 38 provided upon the upper external end of the cylinder. Lug 38 is positioned so that contact between the same and the link construction will position the latter properly for sure contact with the notch 17 or 16.

Referring to Fig. 3, a car in dumped position is shown; the car body will be righted by the application of air to the cylinder 27, which will drive the pin at the upper end of the link construction thereon in to contact with the notch 16ª, and the car will thereby be given a sudden impetus upwardly, which will cause the same to be righted. In the case of the righting movement also, the link construction does not remain in contact with the car body until the latter has reached its normal position, inasmuch as the initial impetus is sufficient to carry the car back to the normal position. The radius of each of the notches 16ª and 17ª drawn from the pivot 39 is of such length that when the car body is being dumped, notch 17ª will just clear the outer end of the link construction 34, and will bring notch 16ª into proper position, when the car is dumped, with relation to the link construction, so that the latter will surely contact therewith when the air is applied to its cylinder.

From the foregoing description it will be seen that I use a cylinder construction for the purpose of giving the car a swift initial dumping movement which will tend to dislodge all particles of material from the car bottom and sides; this manner of operation is not injurious to the car for the reason that the car body is pivotally mounted to dump at either side, and when the parts are kept in proper condition, the car body will require very slight force to cause the same to begin to tilt, and the swift sudden impetus imparted by my construction will effectually dislodge material of a sticky or moist composition, whereas a slow, gentle movement would merely tilt the car and it would therefore be necessary to scrape out the material. My construction renders all this supplemental labor unnecessary.

It is further noted that the link construction does not adhere to the car, but merely contacts therewith long enough to give the necessary dumping impetus, whereupon the same is released and the car completes the dumping movement entirely disconnected from the link construction provided.

In righting the car it will be noted that the initial impetus is given to the car body at the upper notch in the plate, and on a line with respect to the vertical central plane of the car that will produce the greatest effect in imparting a sufficient momentum to the car body so that the latter will be carried back to its normal position without a continuing contact with the piston rod. Therefore the cylinders and piston rods provided here are of much less length than would be required if the application were otherwise made, thereby not only economizing material, but performing the desired function in a highly efficient manner. Further by making the connection between the car body and the piston at all times merely one of impact, so that as soon as the air is withdrawn the piston rod drops out of contact with the car body, I avoid all the accidents possible in a construction in which the piston rod is secured to the car body during the dumping or righting movement, in case the air should fail to operate properly.

The means herein provided for dumping and righting cars are extremely simple in their construction, and contain no parts which can readily be gotten out of order, and can be readily applied to the cars now in use, and are withal highly efficient and adapted for use in the dumping of the most obstinate materials.

Having described my invention, what I claim as new and desire to secure by Letters Patent is:

1. In a dump car a car body mounted upon a central pivot to swing vertically, fluid operated means arranged on one side of said pivot adapted to be moved into engagement with said car body to dump the same, and other fluid operated means arranged on the opposite side of said pivot adapted to be moved into engagement with said car body to right the same.

2. In a dump car a car body mounted upon a central pivot to swing vertically, fluid operated means arranged on one side of said pivot adapted to be moved into engagement with said car body to dump the same, whereupon said means falls out of engagement with said car body, and fluid operated means arranged on the opposite side of said pivot adapted to right said car body, whereupon said latter means falls out of engagement with said car body.

3. In a dump car, a car body mounted upon a central pivot to swing vertically thereon, and fluid operated means adapted to be moved into engagement with said car body to dump the same, said means being freed from engagement therewith and returned to its normal position for a succeeding operation when said car body has been tilted beyond its center of gravity.

4. In a dump car a car body mounted upon a central pivot to swing vertically thereon, a member on said car body extending on both sides of said pivot, a cylinder arranged on one side of said pivot having a piston rod adapted to engage one side of said member to dump said car, and a second cylinder on the opposite side of said pivot adapted to engage the opposite side of said member to right said car.

5. In a dump car, a car body mounted upon a central pivot to swing vertically thereon, a plate on said car body having notches arranged in a vertical series on opposite sides thereof, fluid operated cylinders arranged on opposite sides of said pivot each having a piston rod adapted to engage said plate in the lower notch on one side thereof to dump said car body, the latter being adapted to be righted by the engagement of a piston rod of a cylinder on the opposite side with an upper notch on said plate.

6. A dump car comprising a car body pivotally mounted to be dumped laterally, a plate carried by said car body having a series of notches arranged upon its opposite sides, a cylinder arranged upon said car having a fluid operated piston therein, said piston having a rod projecting from said cylinder, a link pivotally mounted upon said rod and adapted to be moved into engagement with a notch upon one side of said plate to dump said car, a second cylinder mounted upon said car and having a fluid operated piston therein, a rod carried by said piston and projecting from said cylinder, a link pivotally carried by said rod and adapted to be moved into engagement with a notch on said plate to restore said car to its normal position.

7. A dump car comprising a car body pivotally mounted to be dumped laterally, a cylinder mounted upon said car having a piston therein, a rod carried by said piston, a link pivotally carried by said rod, fluid means for moving said link into engagement with said car body to dump the latter, means carried by said cylinder for retracting said link out of engagement with said car body when the desired dumping movement has been imparted thereto, and means for positioning said link properly for engaging said car body at a desired point.

8. A dump car comprising a car body pivotally mounted to be dumped laterally, a plate mounted upon said car and having a series of concentric notches arranged at each side thereof, cylinders mounted upon said car at each side of the vertical median line of the latter, each of said cylinders having a fluid operated piston therein for reciprocation, a rod carried by said piston, a link pivotally carried by said rod and normally out of engagement with said plate, means for maintaining said link in proper position for engagement with said plate, means for moving said link into engagement with the appropriate notch on said plate for dumping said car, means for retracting said link out of engagement with said plate when the desired dumped movement has been imparted to said car body, and means for properly positioning said link for a subsequent engagement with said plate.

9. A dump car comprising a car body pivotally mounted to be dumped laterally, a plurality of means normally out of engagement with said car body and adapted selectively to be moved into engagement with said car body to dump the same and to be retracted out of engagement when said dumping movement has been imparted to said car body, the means not thus selected for dumping said car body being adapted to be moved into engagement with said car body when dumped to restore the same to its normal position, and means for retracting said restoring means out of engagement with said car body when the said restoring movement has been imparted to said car body.

In testimony whereof I affix my signature in the presence of two witnesses.

CHARLES H. DOTY.

Witnesses:
    GEO. W. RIGHTMIRE,
    FRED W. HUBBARD.